United States Patent
Wessels et al.

(10) Patent No.: US 9,034,179 B2
(45) Date of Patent: May 19, 2015

(54) METHOD AND DEVICE FOR THE PURIFICATION OF AN AQUEOUS FLUID

(75) Inventors: Leo Peter Wessels, Vianen (NL); Walterus Gijsbertus Joseph Van Der Meer, Sneek (NL)

(73) Assignees: WE CONSULT VIANEN B.V., Vianen (NL); VITENS N.V., Leeuwarden (NL)

( * ) Notice: Subject to any disclaimer, the term of this patent is extended or adjusted under 35 U.S.C. 154(b) by 1047 days.

(21) Appl. No.: 12/703,358

(22) Filed: Feb. 10, 2010

(65) Prior Publication Data

US 2010/0200504 A1 Aug. 12, 2010

(30) Foreign Application Priority Data

Feb. 11, 2009 (NL) .................................... 2002519

(51) Int. Cl.
*B01D 61/12* (2006.01)
*B01D 65/02* (2006.01)
*C02F 1/44* (2006.01)

(52) U.S. Cl.
CPC ............ *B01D 65/02* (2013.01); *B01D 2321/10* (2013.01); *B01D 2321/18* (2013.01)

(58) Field of Classification Search
CPC ...................................................... B01D 65/06
USPC ................... 210/636, 652, 101, 105
See application file for complete search history.

(56) References Cited

U.S. PATENT DOCUMENTS

| | | | | |
|---|---|---|---|---|
| 6,110,374 A | * | 8/2000 | Hughes | 210/638 |
| 6,158,721 A | * | 12/2000 | Katou et al. | 261/26 |
| 6,454,871 B1 | * | 9/2002 | Labib et al. | 134/8 |
| 6,508,937 B1 | * | 1/2003 | Kawashima et al. | 210/652 |
| 6,702,944 B2 | * | 3/2004 | Husain et al. | 210/636 |
| 2002/0170863 A1 | * | 11/2002 | Singh et al. | 210/798 |
| 2003/0132160 A1 | * | 7/2003 | Khudenko | 210/605 |
| 2008/0099399 A1 | | 5/2008 | Skinner et al. | |
| 2008/0305540 A1 | * | 12/2008 | Hickey et al. | 435/297.1 |

FOREIGN PATENT DOCUMENTS

| | | | | |
|---|---|---|---|---|
| EP | 0079040 A2 | * | 5/1983 | ......... B01D 29/0063 |
| JP | 2004202409 | | 7/2004 | |
| NL | 1030142 | | 4/2007 | |
| WO | WO-2007/043879 | | 4/2007 | |

\* cited by examiner

*Primary Examiner* — Bobby Ramdhanie
*Assistant Examiner* — Denise R. Anderson
(74) *Attorney, Agent, or Firm* — Peacock Myers, P.C.; Jeffrey D. Myers

(57) ABSTRACT

A method and device for the cleaning of spiral wound membranes. In the device two or more spiral wound membranes are included in series in pressure tubes. The membranes are cleaned by longitudinal rinsing with water, in which a well-dissolvable gas has been dissolved. In the device for the purification of an aqueous fluid with spiral wound membranes, the membranes can be longitudinal rinsed with water, in which a well-dissolvable gas has been dissolved. As gas that is well-dissolvable preferably $CO_2$ gas or a mixture of gasses is used.

14 Claims, 2 Drawing Sheets

METHOD AND DEVICE FOR THE PURIFICATION OF AN AQUEOUS FLUID

CROSS-REFERENCE TO RELATED APPLICATIONS

This application is a continuation of Dutch Patent Application Serial No. 2002519, entitled "Method and Device for the Purification of an Aqueous Fluid", to WE Consult Vianen B. V. and Vitens N. V., filed on Feb. 11, 2009, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention is related to a method and device for the purification of an aqueous fluid with the application of spiral wound membrane modules, as well as a device for the implementation of this method.

2. Description of Related Art

The purification of aqueous fluids with the application of spiral wound membranes is known, mostly of the type nano-filtration or reverse osmosis (RO)/hyper-filtration, in which such membranes are arranged in series in horizontally installed pressure tubes.

Devices with spiral wound membranes that are arranged according to the state of the art in series in horizontally installed pressure tubes are often preceded by an extensive pre-treatment, in order to prevent or to limit serious pollution of the spiral wound membranes. Such pre-treatment often consists of microfiltration or ultra-filtration, if necessary combined with rapid sand filtration and/or active carbon filtration.

Apart from an extensive pre-purification, a frequent chemical purification is also applied in order to clean the spiral wound membranes. The method is according to the state of the art of longitudinal rinsing and re-circulating with water to which chemicals are added at the feeding side of the spiral wound membranes.

The device and method from Dutch patent no. 1030142 for the purification, more specifically the desalination of a fluid, more specifically with the application of a pressure tube and spiral wound membrane module, are also known.

NL 1030142 describes a device for the purification, more specifically the desalination of a fluid, in particular water with the application of a pressure tube and a spiral wound membrane module, in which inside the pressure tube several standard spiral wound membrane modules are installed in parallel and vertically.

According to the method from Dutch patent no. 1030142 a fluid, more specifically water, is desalinated, by which the fluid to be filtered is directed to a pressure tube, in which the fluid to be filtered is directed through at least two membrane modules that are arranged in parallel in the pressure tube, while creating a concentrate flow and a filtrate, and that after pollution of the membrane modules the membrane modules are cleaned hydraulically, with water and/or gas, while reversing the flow during the operation, and afterwards the method for the purification is continued again.

DISADVANTAGES OF THE STATE OF THE ART

The purification of an aqueous fluid with the application of spiral wound membranes is known, mostly of the type nano-filtration or reverse osmosis, in which such membranes are arranged in series in horizontally installed pressure tubes. By doing so pollution of the membranes and feed spacers occurs. This concerns mainly pollution as a result of scaling, biofouling, adsorption of substances to membrane and feed spacers, and pollution as a result of accumulation of particles in the feed spacers.

Because of the pollution of the membrane modules, the energy use increases as a result of full or partial blockage of the feed channels in the feed spacer. As a result of this, the pressure drop over the feed spacers increases. Apart from that, the pressure drop over the membrane itself also increases as a result of pollution of the membrane surface.

In some cases the pressure drop over the feed spacers increases to such an extent that the distribution of feed water over the membrane surface becomes problematic. In practice it even happens, as a result of the high pressure drop over the feed spacers, that the membrane modules are mechanically damaged, because the spiral wound modules deform lengthwise. This phenomenon is known under telescoping.

In the state of the art the pollution of the spiral wound membranes is particularly limited by the application of an extensive pre-purification of the aqueous fluids to be cleaned. Such a pre-purification often concerns microfiltration or ultra-filtration membranes, sometimes in combination with rapid sand filtration and/or active carbon filtration or another type of biological filtration. The disadvantages of such extensive pre-purifications are higher costs and a higher use of chemicals and energy.

In order to remove the pollution of the membranes and feed spacers that still occurred, despite the extensive pre-purification, chemicals are frequently used for cleaning in the state of the art. This has the disadvantage of a large consumption of chemicals, which inflicts high costs and an extra negative impact on the environment.

The hydraulic cleaning of spiral wound membranes with a gas/water mixture as known in the state of the art, as known from Dutch patent no. 1030142, has disadvantages as well. In the invention according to NL 1030142 hydraulic cleaning with a gas/water mixture is only possible when the membranes are switched in parallel. This is because the gas/water proportion cannot be regulated when various modules are arranged in series. Also the gas distribution is problematic when the membrane modules are arranged horizontally.

Because the gas/water rinsing from patent NL 1030142 is only possible for membranes switched in parallel, this method can only be applied in new installations when a switch in parallel of the membranes can be applied. To this means, in NL 1030142 a new type of pressure vessel is proposed. However, in the current practice there are many problems with membrane pollution in horizontal systems, in which spiral wound membranes are arranged in series. For those installations NL 1030142 offers no solution.

BRIEF SUMMARY OF THE INVENTION

An objective of the present invention is to provide for an improved method and device, at which the aforementioned disadvantages have been alleviated.

To this means, the invention entails a method for the purification of a fluid, especially an aqueous fluid, with the application of spiral wound membrane modules, characterized in that the suspended substances that are present in the aqueous fluid, such as solid particles, bacteria, viruses, and dissolved substances (such as salts), solved organic substances, pesticides and the like, are removed at the same time while applying at least one horizontally arranged pressure tube with two or more spiral wound nano-filtration or hyper-filtration membranes arranged in it in series, in which the membranes are periodically rinsed with water, in which a well-dissolvable gas or gas mixture has been dissolved, and in which the following steps are followed:

(1) production of permeate under simultaneous and continuous emission of concentrate and (2) longitudinal rinsing with water the membrane, in which a well-dissolvable gas or gas mixture has been dissolved in advance.

Examples of aqueous fluids for which the invention can be used are raw or pre-treated seawater, fresh or brackish surface water, fresh or brackish groundwater, communal or industrial waste water, process water, etcetera.

Next to aqueous fluids also non-aqueous fluids may be used such as organic fluids for example an alcohol, etcetera.

DESCRIPTION OF THE INVENTION

In view of an efficient method according to the invention, it is a great advantage if use is made of a gas with solvability in water that is higher than 100 mg and preferably higher than 500 mg at 20° C. and at atmospheric pressure. A gas with such high solvability has the advantage that more gas is dissolved in water and therefore more gas formation can occur upon hydraulic headloss or relaxation of pressure. Apart from that, an important advantage of such a gas is that gas that was left behind will dissolve quickly after step 2 when operated with high pressure during step 1.

With the method according to the invention it is profitable that during step 2 a water flow of at least 50% and preferably more than 75% of the feed flow during step 1 is used. For an appropriate degassing, sufficient pressure drop over the membrane modules is necessary. To this means, the rinsing flow must be sufficiently high. Apart from that, a sufficiently high water flow must be used during the longitudinal rinsing, in order to be able to properly remove the fouling and particulates that was set free.

In a special embodiment of the method according to the invention, the longitudinal rinsing during step 2 is carried out separately for each stage. As a result of this, lower pressure can be applied, because of which more degassing can take place. Higher degassing is profitable for the cleaning effect.

In the method according to the invention in step 2 the gas is preferably dosed in gaseous state in a bypass tube, at which the pressure at the location of the gas dosing is higher than the pressure in the feed to the first membrane. As a result of this the gas is easily and quickly dissolved in the feed.

In the method according to the invention in step 2 it is preferable that at least as much gas is dosed as can theoretically be dissolved at the actual temperature in the feed flow at the pressure in the feed to the first membrane.

In a specifically advantageous embodiment according to the invention, in step 2 in the discharge tube of the membranes a counter-pressure is maintained, at which this counter-pressure is alternately decreased and increased. Because of the counter-pressure, more gas can be dissolved. This larger amount of dissolved gas causes more gas formation upon temporary pressure decrease.

It is preferable that in step 2 the counter-pressure in the discharge tube of the membranes is alternately decreased and increased, wherein simultaneously the pressure in the feed to the first membrane with the same values, but oppositely, is increased and decreased. In this way the feed pump that is used for the longitudinal rinsing can keep operating at a constant pressure and flow.

In the method according to the invention, in step 2 the flow direction through the membrane elements can be kept the same as the flow direction in step 1. The flow direction through the membrane elements can also be applied in the opposite direction from the flow direction during step 1.

In a special embodiment of the method according to the invention, the gas is dosed in the feed in the last phase of step 1. By this, use is made of the higher pressure in step 1, because of which much gas can be dissolved. Upon the start of step 2 the pressure is subsequently decreased and this dissolved gas will transfer to the gas phase.

It is noted that it is profitable when the gas is dosed in the feed during the last phase of step 1.

In another special embodiment of the method according to the invention, during step 2 the longitudinal rinsing is stopped and the membranes are soaked in the fluid for five minutes or longer. It is preferable that the longitudinal rinsing is stopped for one day or longer, at which the membranes axe soaked in the fluid. The prolonged soaking in a water/gas mixture in absence of oxygen is effective in the combat of the biofouling.

In the method according to the invention, during step 1 or step 2 chemicals can be dosed to the feed to the membranes. Such chemicals are antiscalants, lye, acid, disinfecting chemicals or bactericides.

In a special embodiment of the method according to the invention, pure carbon dioxide or another suitable gas or gas mixture is used as gas. It is preferable that enough carbon dioxide is dosed so that the acidity of the water that is longitudinal rinsed the membranes is lower than or equal to 7.

In a special embodiment of the method according to the invention, in which carbon dioxide is used, in step 1 during a limited period that is adjustable, a flocculant that is dissolvable in an acid environment is dosed to the feed to the membranes. It is preferable that iron chloride is used for this. Iron chloride builds up a protective layer of iron hydroxide on the membrane, because of which substances and biomass do not directly adhere to the membrane, but to the protective iron hydroxide layer. The iron hydroxide can subsequently easily be removed by the rinsing with water and carbon dioxide.

In another special embodiment of the method according to the invention, in which carbon dioxide is used, in step 2 during a limited period that can be adjusted, particles are dosed to the feed to the membranes, or are built up in the feed to the membranes. Preferably particles are used or formed, that are dissolvable in an acid environment. Iron chloride or lime milk is preferably used for this. In another special embodiment of the method according to the invention, in which carbon dioxide is used, in step 2 the carbon dioxide gas that is released as free gas is separated from the out flowing rinsing water and trough a closed pipe line system is discharged to the atmosphere or reused. This is necessary for operator's safety reasons as inhalation of carbon dioxide in a high concentration, can cause health problems or even death. It is advantageous to reuse the carbon dioxide as it reduces the discharge to the environment.

In another special embodiment of the method according to the invention, in which carbon dioxide is used, in step 2 the carbon dioxide that is still dissolved in the out flowing rinsing water is removed from the rinsing water before discharge, and reused.

BRIEF DESCRIPTION OF THE SEVERAL VIEWS OF THE DRAWINGS

The present invention is further elaborated by means of FIGS. 1 and 2.

DETAILED DESCRIPTION OF THE INVENTION

Figure 1:
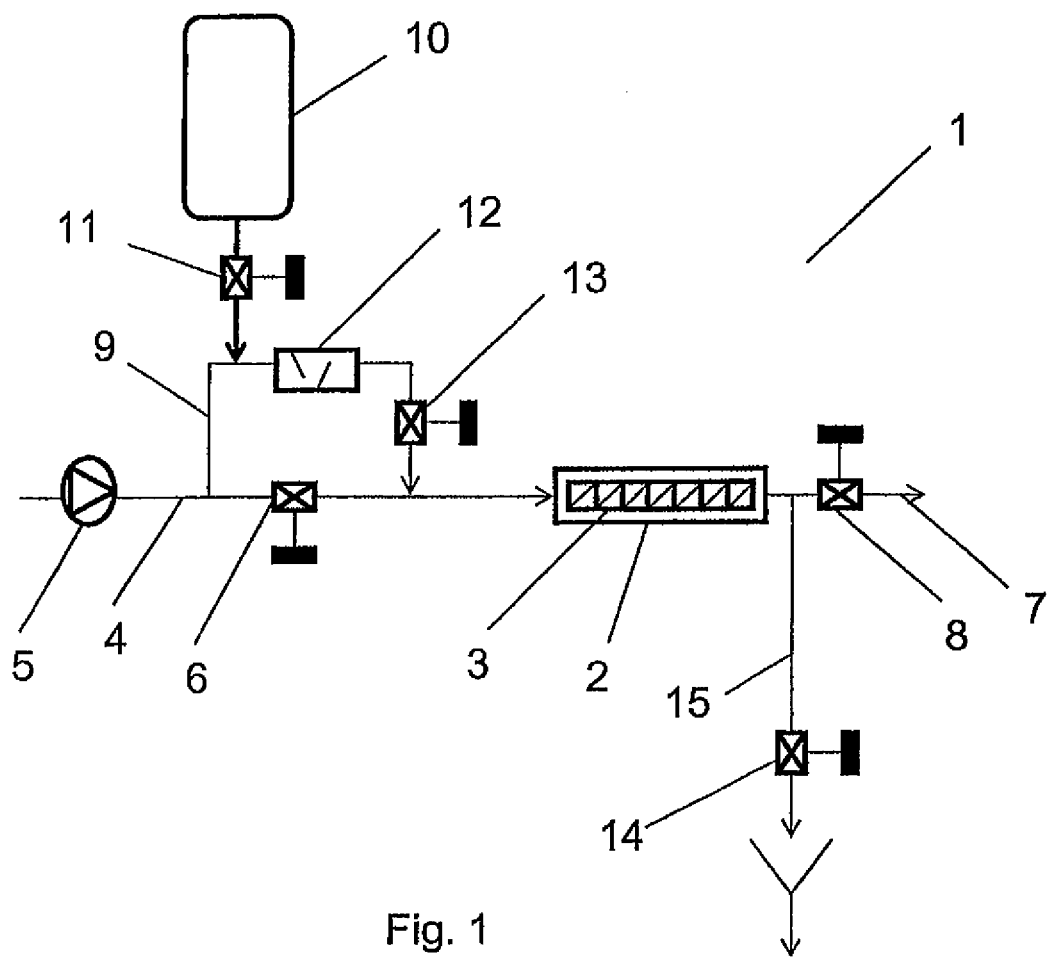
FIG. 1 shows an embodiment of the device according to the invention without a discharge for the concentrate in the centre of the pressure tube.

Furthermore, the invention is related to a device with which the method according to the inventions can also be implemented properly, this device is shown in FIG. 1. This device is equipped with one or more pressure tubes 2 with two or more spiral wound membranes 3 hydraulically arranged in series inside, at which the pressure tubes 2 are connected with the common feed tube 4 with a feed pump 5 in it and an open/close valve 6, and at which in the common discharge 7 for the concentrate a control valve 8 is included, at which a bypass tube 9 is connected to the common feed tube 4, and at which a gas storage and dosing vessel 10 via a dosing valve 11 is connected with bypass tube 9, and at which a control valve 13 is arranged in the bypass tube 9 downstream of the dosing valve 11, and at which a control valve 14 is arranged in the discharge of the rinsing water 15.

In the device according to the invention, a mixing device 12 is preferably arranged between the gas dosing valve 11 and the control valve 13 in the by-pass tube 9.

In the device 1 according to the invention, a regulation unit is preferably provided for dosing the correct amount of gas, for which the regulation is based on the fluid flow, the pressure at the location of the feed to the first membrane and the temperature of the fluid at the location of the gas dosing.

In the device according to the invention a regulation unit is preferably provided for keeping the pressure on the location of the gas dosing constant, by which the regulation keeps the sum of pressure drop over both control valves 13 and 14 constant, and by which the regulation varies the pressure drop over the individual control valves 13 and 14 frequently, and opposite to each other.

In an advantageous embodiment of the device according to the invention, tube connections and valves are provided for, so that the flow direction during step 2 can take place in the opposite direction of the flow direction during step 1.

Figure 2:
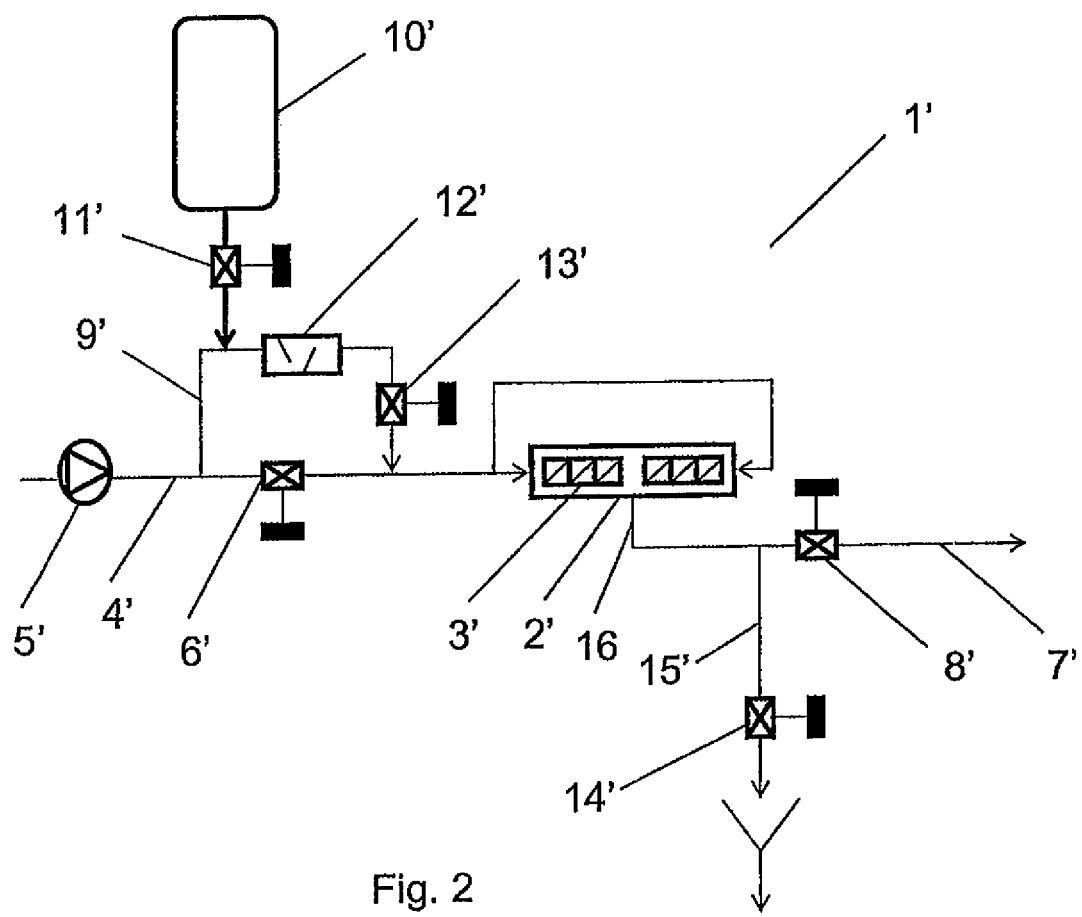
FIG. 2 shows a device according to the invention with discharge for concentrate in the centre of the pressure tube.

A special embodiment of the device according to the invention is presented in FIG. 2 with a pressure tube in it 2' in which two or more spiral wound membranes 3' are arranged in series, and at which the pressure tube has a discharge 16 for the concentrate at around the middle of the tube. Feed tube 4' connects to pressure tube 2', whereas discharge 16 is connected with control valve 8' and discharge tube 7'.

It is noted that the invention is by no means limited to the embodiments as previously described.

What is claimed is:

1. Method for the cleaning of spiral wound nano-filtration or hyper-filtration membrane modules arranged in series, inside in at least one pressure tube, in which an aqueous fluid to be purified is separated into permeate along with simultaneous and continuous emission of concentrate, wherein suspended substances that are present in the aqueous fluid, including solid particles, bacteria, viruses, and dissolved substances, including salts, dissolved organic substances, and pesticides, are removed as said concentrate flows, and in which the membranes are periodically rinsed with water and a gas for cleaning purposes, wherein said cleaning method comprises the following steps:
   (i) dosing of gas in said water,
   (ii) dissolving said gas of step (i) in said water,
   (iii) longitudinal rinsing of the membrane with said water, in which according to step (ii) a readily soluble gas or mixture of soluble gasses has been dissolved in advance, wherein in the discharge tube of the membranes a counter-pressure is maintained, at which this counter-pressure is alternately decreased and increased, and wherein simultaneously the pressure in the feed to the first membrane with the same values, but opposite, is increased and decreased, and
   (iv) transferring said dissolved gas from the liquid phase to the gas phase for removing the fouling and particulates that were set free from the membranes, wherein step (iv) is carried out by hydraulic headloss or relaxation of pressure.

2. Method according to claim 1, wherein the aqueous fluid is raw or pre-treated seawater, fresh or brackish surface water, fresh or brackish groundwater, communal or industrial waste water, or process water.

3. Method according to claim 1, wherein the water flow during step (iii) is higher than 50% of the feed flow during the production of permeate under simultaneous and continuous emission of concentrate.

4. Method according to claim 3, wherein the water flow during step (iii) is higher than 75% of the feed flow during the production of permeate under simultaneous and continuous emission of concentrate.

5. Method according to claim 1, wherein in step (i) the gas is dosed in gaseous state in a bypass tube, at which the pressure at the location of the gas dosing is higher than the pressure in the feed to the first membrane.

6. Method according to claim 1, wherein in step (i) at least as much gas is dosed as can theoretically be dissolved at the actual temperature in the feed flow at the pressure in the feed to the first membrane.

7. Method according to claim 1, wherein in step (iii) the flow direction through the membrane modules is opposite to the flow direction in the step of production of permeate under simultaneous and continuous emission of concentrate.

8. Method according to claim 1, wherein carbon dioxide is used as the gas.

9. Method according to claim 8, wherein in step (iii) during a limited, adjustable period, particles are dosed to the feed to the membranes.

10. Method according to claim 8, wherein the carbon dioxide that is released from the rinsing water as free gas is separated from the out flowing rinsing water and through a closed pipe line system is discharged to the atmosphere or reused.

11. Method according to claim 1, wherein the gas is dosed in a feed tube during production of permeate along with simultaneous and continuous emission of concentrate.

12. Method according to claim 1, wherein in the step of production of permeate under simultaneous and continuous emission of concentrate or step (iii), one or more of the group consisting of antiscalants, lye, acid, disinfecting chemicals, and bacteriocides, are dosed to the feed to the membranes.

13. Method according to claim 12, wherein in the step of production of permeate under simultaneous and continuous emission of concentrate, during a limited, adjustable period a flocculant that can be dissolved in an acid environment is dosed to the feed to the membranes.

14. Method according to claim 13, wherein the flocculant is iron chloride.

* * * * *